J. W. IVORY.
DEVICE FOR SHAPING DENTAL WOODEN STICKS, &c.
APPLICATION FILED MAR. 31, 1913.
1,102,753.
Patented July 7, 1914.
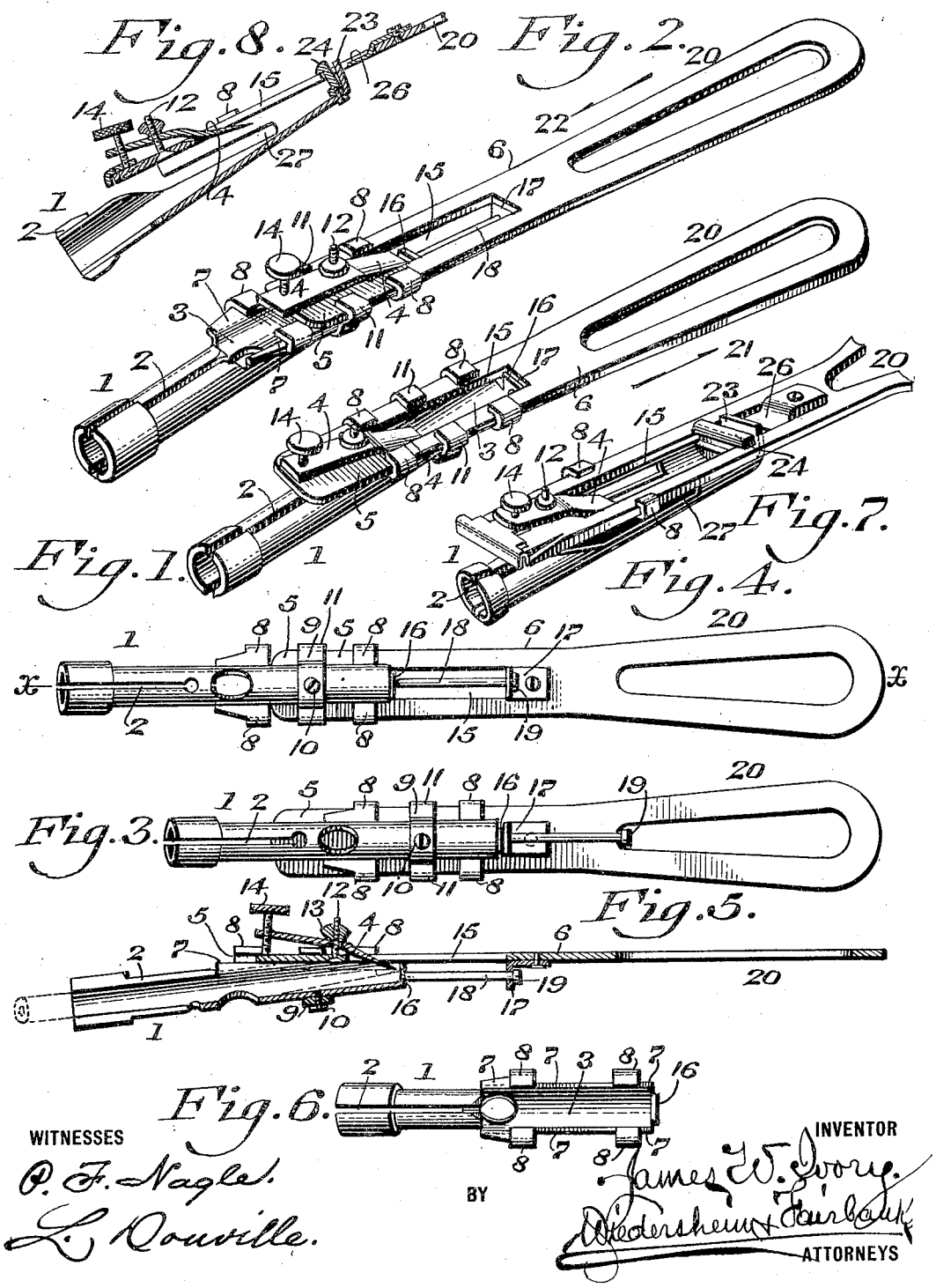

UNITED STATES PATENT OFFICE.

JAMES W. IVORY, OF PHILADELPHIA, PENNSYLVANIA.

DEVICE FOR SHAPING DENTAL WOODEN STICKS, &c.

1,102,753.  Specification of Letters Patent.  Patented July 7, 1914.

Application filed March 31, 1913. Serial No. 758,008.

*To all whom it may concern:*

Be it known that I, JAMES W. IVORY, a subject of the King of Great Britain, residing in the city and county of Philadelphia, State of Pennsylvania, have invented a new and useful Device for Shaping Dental Wooden Sticks, &c., of which the following is a specification.

My invention consists of a device adapted for shaping a dental stick, a lead pencil, or similar objects, after the manner of sharpening or pointing, embodying means for primarily holding the object, means for beveling or reducing the thickness of the same to a sharp edge or point, means for guiding and steadying the cutting member employed and features of details as will be hereinafter set forth.

The invention is satisfactorily illustrated in the accompanying drawing but the important instrumentalities thereof may be varied, and I do not therefore limit myself to to the precise arrangement and organization shown and described, but I consider myself at liberty to make such changes and alterations as may fall fairly within the spirit or scope of the appended claims.

Figures 1 and 2 represent perspective views of a shaping device embodying my invention, certain members in Fig. 2 being in different positions from those shown in Fig. 1. Fig. 3 represents a bottom plan view of the device shown in Fig. 1. Fig. 4 represents a bottom plan view of the device shown in Fig. 2. Fig. 5 represents a longitudinal section of the device in the position shown in Figs. 2 and 4. Fig. 6 represents a plan view of a detached member of the device. Fig. 7 represents a perspective view of another embodiment of the invention. Fig. 8 represents a side elevation of a portion thereof.

Similar numerals of reference indicate corresponding parts in the figures.

Referring to the drawings:—1 designates a tube which is adapted to receive a pencil or other object to be sharpened, it being divided or slotted longitudinally as at 2, so as to adapt the same to be contracted and so take hold of the pencil or object and then to expand or release the same. The inner portion of said tube has its upper part cut away forming the passage 3 which receives the blade or knife 4 whose cutting edge enters the tube 1 below said passage, said blade being connected with the head 5 of the stock 6 which is slidably mounted on the upper walls 7 of the passage 3 and connected therewith by the channeled lips 8 which are formed on the tube 1 and freely embrace the side portions of said stock. As additional means of connecting the stock with the tube, I employ the clasp 9 which embraces the tube and is secured thereto by the screw 10 and has on its ends the channeled lips 11 which freely embrace the sides of the head 5 of the stock.

The walls 7 of the passage 3 are inclined so that the motion of the stock is in inclined direction thereon whereby the cutting edge traverses the interior of the tube in a direction at an inclination thereto and so advances against and cuts the lead pencil or object inserted in the tube after the manner of sharpening a lead pencil or stick.

The blade 4 is connected with the head 5 by the screw 12 whose head is connected with the under side of said head, said screw passing freely through the blade and carrying on its outer portion the nut 13 which is adapted to tighten on the outer side of the blade, the latter carrying also the set screw 14 whose point bears on the blade so that by properly rotating the screw, the angle of the blade may be varied, and the blade most firmly held in position, it being noticed that the stock has a passage 15 therein so as to receive the cutting edge portion of the blade, said passage being in communication with the passage 3 in the top wall of the tube and consequently with the interior of the latter.

On the inner end of the tube is the upturned lip 16 and on the opposite terminal of the passage 15 in the stock 6 is the downturned lip 17. Connected with the lip 16 is the rod 18 which is adapted to pass freely through the lip 17 and has a head 19 which is adapted to abut against said lip 17 and provide a stop for limiting the forward movement of the stock, in the present case, to the right, it being noticed that in the motions of the stock the lip 17 is slidable on the rod 18 and thus the stock is rendered firm and steady in said motions. The lip 16 forms an abutment for one end of the lead pencil or object to be sharpened as most plainly shown in Fig. 5. The stock is provided with a handle such as 20 whereby the former may be moved conveniently in opposite directions as shown by the arrows 21 and 22 in Figs. 1 and 2.

The operation is as follows:—The device is in open or operative position as shown in Fig. 1. The pencil or object to be sharpened is inserted in the tube 1, and the divided portion of the latter pressed by the fingers against the same so as to take firm hold thereof. Then, the stock is moved in the direction of the arrow 21, whereby the blade cuts the end of the pencil or object in inclined direction after the manner of sharpening or pointing, the members of the device now being in the position as shown in Fig. 2. Then, the stock is returned in the direction of the arrow 22 when the parts are again in the position shown in Fig. 1. The divided portion of the tube is then released of the fingers when the pencil or object is rotated when the stock is again advanced to the right, and the blade cuts the pencil or object at a fresh place but similar to the first action and so the operation of sharpening or pointing the stick may be continued until accomplished.

It is evident that in shaping a dental stick it may be turned to be cut at two opposite places thus forming said stick with a tapering flat or wedge shaped pointed end.

In Figs. 7, and 8, the lips 16 and 17 and 18 and 19 are dispensed with and in lieu thereof the inner end of the tube is turned up forming the lip 23 which freely enters the passage 15 and has connected with it, the cross bar 24 whose ends freely overhang the side walls of said passage 15, said cross bar being secured to said lip by the screw 25. At the terminal of the passage 15 adjacent to the handle 20 is the finger 26, which projects toward the lip 23 and forms a stop therefor when the tube 1 is in primary position preparatory to the insertion thereinto of the stick, pencil, etc., to be sharpened or cut. In order to increase the resiliency of the tube 1 the slot 2 is extended toward the lip 23 as at 27, the effect of which is evident.

Having thus described my invention what I claim as new and desire to secure by Letters Patent, is:—

1. A device for shaping an object in the manner specified, comprising a longitudinally-slitted tubular member to hold the object, a stock slidably mounted on said member, a blade therein with its cutting edge extending in said member, a handle fixed to said stock for reciprocating it, and means on the tubular member movable therewith and slidably connected with said handle and limited in its movements toward the blade.

2. A device for shaping an object in the manner specified, comprising a longitudinally slitted tubular member to hold the object, a stock slidably mounted on said member, a blade adjustably mounted on said stock with its cutting edge extending into said member, said member being provided at one end with an angular portion forming a stop, a handle fixed to said stock for reciprocating it, and means for limiting the reciprocation of the stock slidably connecting said handle and angular portion.

3. A device for shaping an object in the manner specified, comprising a longitudinally slitted tubular member to hold the object, a stock slidably mounted on said member, a blade adjustably mounted on said stock with its cutting edge extending into said member, said member being provided at one end with an angular portion forming a stop, a handle fixed to said stock for reciprocating it, a lip on said handle, and a rod for limiting the reciprocation of the stock slidably connecting said lip and angular portion beneath the former.

4. A device for shaping an object in the manner specified, comprising a compressible object-receiver, a member slidable lengthwise thereon, a blade mounted on said member, means at an angle to said receiver forming a stop for the object to be sharpened, means for holding said blade at different angles with relation to the receiver, a lip depending from the said member, and a rod for limiting the reciprocation of the stock slidable through said lip and connected with said receiver.

JAMES W. IVORY.

Witnesses:
JOHN A. WIEDERSHEIM,
N. BUSSINGER.

Copies of this patent may be obtained for five cents each, by addressing the "Commissioner of Patents, Washington, D. C."